Patented Feb. 19, 1952

2,586,364

UNITED STATES PATENT OFFICE 2,586,364

CHLOROPENTAFLUOROBENZENE

Earl T. McBee, Lafayette, Ind., Waldo B. Ligett, Detroit, Mich., and Vincent V. Lindgren, West Lafayette, Ind., assignors to Purdue Research Foundation, Lafayette, Ind., a corporation of Indiana No Drawing. Application August 9, 1946, Serial No. 689,514

1 Claim. (Cl. 260—650)

This invention relates to a process for the dehalogenation of cyclic halocarbons containing fluorine attached to carbon atoms of the cyclic nucleus and especially to the treatment of saturated alicyclic ring-fluorine-containing halocarbons. The invention further pertains to a process whereby the number of nuclear carbon-carbon multiple bonds in such a cyclic ring-fluorine-containing halocarbon may be increased. A preferred embodiment of our invention relates to the preparation of aromatic fluorocarbons and aromatic halocarbons containing ring-fluorine atoms.

The preparation of unsaturated cyclic halocarbons containing ring-fluorine atoms is usually attended by considerable difficulty. Although cyclic halocarbons containing one or two nuclear double bonds and ring-fluorine atoms have been prepared, previous attempts to prepare aromatic fluorocarbons or aromatic halocarbons containing ring-fluorine atoms have usually met with failure. Fluorinating agents used in the attempted preparation of aromatic compounds containing ring-fluorine atoms have generally resulted in a fission of the molecule, entire saturation of the molecule, or at best, alkenic or alkadienic fluorine-containing alicyclic halocarbons. Numerous methods are at present available for producing saturated fluorine-containing alicyclic halocarbons in good yields, but no method has been available for producing aromatic fluorocarbons or aromatic halocarbons containing ring-fluorine atoms.

We have now found that we can produce aromatic fluorocarbons or aromatic halocarbons containing ring-fluorine atoms by utilizing saturated or unsaturated alicyclic ring-fluorine-containing halocarbons. Likewise we obtain unsaturated alicyclic fluorocarbons or halocarbons containing fluorine attached to the ring and having at least one more double bond than the starting compound by utilizing saturated or unsaturated alicyclic halocarbons containing at least one fluorine atom attached to a carbon atom of the ring. The provision of a process whereby the above may be accomplished is an object of our invention.

We have found that we can produce aromatic fluorocarbons or aromatic halocarbons containing fluorine attached to the ring by utilizing saturated or unsaturated alicyclic ring-fluororine-containing alicyclic halocarbons. Likewise we obtain unsaturated alicyclic fluorocarbons or halacarbons containing fluorine attached to the ring and having at least one more double bond than the starting material by utilizing saturated or unsaturated alicyclic ring-fluorine-containing halocarbons. The provision of such a process is an object of our invention.

As a further object of our invention we include the provision of a process whereby we may produce new and useful fluorine-containing unsaturated cyclic halocarbons, including alicyclic fluorocarbons and aromatic fluorocarbons. These compounds are useful as dielectrics, heat-transfer media, transformer fluids, insulating material, specific solvents, lubricants, et cetera. Some of these compounds are also useful as intermediates in the preparation of fluorine-containing synthetic resins.

A still further object of our invention is the provision of a process whereby the number of nuclear carbon-carbon multiple bonds in a cyclic, ring-fluorine-containing halocarbon may be increased.

An additional object of our invention is the provision of a process for the removal of halogen atoms, including iodine, bromine, chlorine and fluorine atoms, from the ring of a cyclic halocarbon containing fluorine atoms attached to carbon atoms of the cyclic nucleus and, preferably, to remove halogen atoms in sufficient number or quantity from such a compound to obtain an aromatic fluoro-carbon or ring-fluorine-containing halocarbon.

Other objects of our invention will become apparent hereinafter.

In the practice of our invention, the reactants may be contacted in any suitable manner. We have found that an attenuant such as ethanol, molten acetamide, or water, is especially useful as a medium for the dehalogenation. Thus, we suspend the dehalogenating agent, e. g., zinc or magnesium, in one of the above liquids and add the halocarbon thereto. If the halocarbon derivatives are solids, as with some derivatives of cyclohexane, they may be dissolved in ethanol or ether and the solution added to the suspension. If the derivatives are liquids, as with some derivatives of methylcyclohexane, they may be added as such.

While addition usually involves introducing the halocarbon or halocarbon solution into the dehalogenating agent in suspension, occasionally it may be more advantageous, due to the high viscosity of the halocarbon, to reverse the procedure and add the powdered dehalogenating agent to the halocarbon in a suitable attenuant. The temperature of the reaction is preferably maintained at a rapid reflux, either by the heat of reaction or by suitable external means, in case sufficient heat is not produced by the reaction.

When addition is complete, the mixture may be refluxed for a suitable period, e. g., from one to eight hours, at a suitable temperature, e. g., 90–120 degrees centigrade using an ethanol medium, or from approximately 100 to 200 degrees centigrade using an acetamide medium. The diluent and low-boiling products may then be distilled from the reaction flask and, when the remaining reaction mixture becomes too viscous to permit stirring, superheated steam may be introduced to extract higher boiling compounds. The organic products may be washed with dilute alkali and water, dried and rectified.

The dehalogenating agents of the present invention are chosen from the group comprising zinc and magnesium, but other dehalogenating agents may be employed provided they are capable of accomplishing the objects of the invention.

In case acetamide is used as the suspension medium during dehalogenation, sodium iodide may be used as a catalyst. An alcohol solution may be added to the acetamide suspension to maintain a more fluid mixture. Temperatures may vary from 100 degrees centigrade during addition of the halogen carbon mixture to about 180 degrees centigrade or even higher at the end of product distillation. On several occasions where the reaction temperature was maintained at about 200 degrees centigrade, slightly more decomposition of reactants was apparent than when lower temperatures were employed. An advantage of an acetamide medium for the process is the increased yield of lower-boiling products and usually also of the aromatic fluorine-containing halocarbons and fluorocarbons; however, difficulties are sometimes attendant upon the separation of products from the acetamide medium.

After experimentation, a convenient method of dehalogenation of an alicyclic compound containing fluorine and at least two halogen atoms other than fluorine attached to carbon atoms of the cyclic nucleus, was found to be the following: The cycle halocarbon is first dehalogenated in ethanol and the products rectified. Intermediate fractions are then dehalogenated in an acetamide solution yielding more of the desired products possessing a higher degree of unsaturation. Using this method, the yield of products, based on the compound from which the saturated cyclic halocarbon was prepared, usually exceeds fifty per cent, and the best recovery of unsaturated cyclic derivatives is of the order of about eighty per cent. Using a continuous process, whereby intermediate fractions are continually re-dehalogenated, these figures are much higher.

Among the compounds which may be dehalogenated according to the method of the present invention may be mentioned perhalocyclobutanes and perhalocyclobutenes, of which tetrachlorotetrafluorocyclobutane may be considered representative; perhalocyclopentanes and perhalocyclopentenes, of which dichlorooctafluorocyclopentane, bromochlorohexafluorocyclopentene, dibromochloropentafluorocyclopentene and dichlorohexafluorocyclopentene may be considered representative; perhalocyclohexanes, perhalocyclohexenes and perhalocyclohexadienes, of which dibromodichlorooctafluorocyclohexane, bromodichloroheptafluorocyclohexenes, and dichlorohexafluorocyclohexadiene may be considered representative. Iodine-containing cyclic compounds wherein fluorine atoms are attached to carbon atoms of the ring may be readily dehalogenated according to the method herein disclosed. Other derivatives, such as perhalo derivatives of methyl of other alkyl-substituted cyclohexanes, cyclohexenes and cyclohexadienes, alkyl-substituted cyclopentanes and pentenes; bicyclohexyl derivatives; tetralin and decalin derivatives; anthracane derivatives, as well as many other cyclic perhalo compounds containing at least one fluorine atom attached to a carbon atom of the ring, may also be dehalogenated according to the present invention.

A preferred embodiment of the invention resides in the removal of at least one fluorine atom from the ring of a cyclic ring-fluorine-containing halocarbon. In this manner it is possible to produce a compound such as, for example, hexafluorobenzene from a compound such as dichlorooctafluorocyclohexene, and to produce a compound such as, for example, dichlorohexafluorocyclohexadiene from a compound such as tetrachlorooctafluorocyclohexane. While the above are given merely by way of illustration, it will be seen from the examples that many similar dehalogenations are possible wherein at least one fluorine atom is removed from the ring of a cyclic ring-fluorine-containing halocarbon. As before stated, this constitutes a preferred embodiment of the invention.

The container used for the operation may be of any suitable type. Generally a three-neck, three-liter flask, fitted with a motor-driven stirrer, reflux condenser and dropping funnel, was adaptable to our new process, although a rocking autoclave was employed in some instances when higher temperatures were desired. In cases where the product was distilled from the flask, a Vigreux distilling column replaced the reflux condenser before the distillation was begun.

The dehalogenation process herein concerned has been employed with excellent success as the last step in a three-step process comprising the following: A chlorinated aromatic compound, preferably a halocarbon, is treated with bromine trifluoride at low temperatures resulting in a mixture of compounds containing bromine, chlorine and fluorine, which is then reacted with antimony pentafluoride to replace the bromine with fluorine. This reaction yields a mixture of halocarbons containing chlorine, fluorine and only traces of bromine. The last step in the process involves the removal of halogen, mainly chlorine atoms, using the process as outlined in this application.

The conditions indicated above have been found to be the optimum for the process herein, but it is to be understood that any temperature may be employed which is not conducive to the undesirable decomposition or pyrolysis of the reaction mixture or product and which is within the limits imposed by the vapor pressure of the reaction mixture at the operating pressure. The process may be conducted at temperatures between about 50 and 250 degrees centigrade, if desired, but said optimum temperature as well as the desirable pressure will be found to vary according to the medium employed for the dehalogenation. Any reaction period may be employed, provided only that the time allowed be sufficient for the production of the more nuclearly-unsaturated products.

The following examples illustrate a number of ways in which the principle of our invention may be applied, but are in no way to be construed as limiting the invention thereto.

Example 1

The dehalogenation of saturated halocarbon products having the approximate composition $C_6Cl_4F_3$ was carried out in a three-neck flask fitted with a motor-driven stirrer, reflux condenser, and dropping funnel. One gram-atom (65 grams) of zinc and 50 milliliters of ethanol were placed in the flask and 85 grams of organic product dissolved in 100 milliliters of ethanol was added thereto over a period of two hours. The reaction was maintained at reflux temperature and constant stirring was employed. After all the organic material had been added, the mixture was further stirred and refluxed for three hours. Hydrochloric acid was then added to assist in coagulating the suspended solids, which were filtered off. By addition of water to the alcoholic filtrate, a liquid organic layer was separated. This organic layer was washed with dilute alkali and dried over Drierite. The product was distilled without decomposition over a range of 80–170 degrees centigrade. Rectification yielded hexafluorobenzene, $C_6F_6$, boiling of 81–82 degrees centigrade at 743 millimeters of mercury pressure absolute, and chloropentafluorobenzene, $C_6ClF_5$, boiling at 122–123 degrees centigrade at 750 millimeters of mercury pressure absolute.

Example 2

Eight hundred and fifty grams of organic material, the analysis of which showed it to be substantially $C_6Cl_2F_8$ and $C_6Cl_3F_7$, was dissolved in 500 milliliters of absolute ethanol. This solution was added over a period of four hours to a refluxing suspension of 500 grams of zinc dust in ethanol. The reaction vessel was similar to that used in Example 1. When the reaction was complete, 700 milliliters of product and ethanol was distilled from the flask through a Vigreux column at 60 to 70 degrees centigrade. Water was added to the reaction flask and the remainder of the product distilled with steam. After separation from the alcohol, 507 grams of organic product remained. This product was then washed with water and rectified. The following compounds were identified:

| Compound | B. P., °C. | Grams |
|---|---|---|
| $C_6F_8$ | 56.5 at 745 mm. Hg | 56 |
| $C_6ClF_7$ | 88.3 at 738 mm. Hg | 70 |

Example 3

In a manner similar to the above, a fraction composed largely of $C_6Cl_2F_6$, boiling from 117 to 123 degrees centigrade, was dehalogenated by reaction with an acetamide-zinc dust suspension. Upon rectification in a 100-plate column, two aromatic compounds were separated. They were hexafluorobenzene, boiling at 81–82 degrees centigrade at 743 millimeters of mercury pressure absolute, and chloropentafluorobenzene, boiling at 122.0–123.0 degrees centigrade at 750 millimeters of mercury pressure absolute.

Example 4

Seven hundred and six grams of hexachlorobenzene was treated with bromine trifluoride and the product from the reaction treated with antimony pentafluoride. After treatment with antimony pentafluoride, the solid product contained 40.9 per cent chlorine and 38.2 per cent fluorine, corresponding approximately to a mixture of average composition $C_6Cl_4F_3$, which contains 39.0 per cent chlorine and 41.5 per cent fluorine. This halocarbon mixture was subjected to a dehalogenating procedure as follows:

The solid product was dissolved in 500 milliliters of absolute ethanol and the resulting solution was added over a six-hour period to a refluxing suspension of zinc dust in ethanol. The more volatile products distilled from the reaction mixture with some alcohol, while the higher-boiling constituents were removed by steam distillation. Alcohol was extracted from the products by washing with water. The total halocarbon product weighed 509 grams at this point and was rectified in a four-foot glass-helice-packed column. The following plateaus resulted:

| Compound | Weight, Gms. | Boiling Point (purefied products | mm. Hg |
|---|---|---|---|
| $C_6F_8$ | 55.0 | 56 – 57 | 743 |
| $C_6F_6$ | 23.4 | 81 – 82 | 743 |
| $C_6ClF_7$ | 81.4 | 88 – 89 | 740 |
| $C_6Cl_2F_8$ | 55.3 | 112.5–113.5 | 750 |
| $C_6Cl_2F_6$ | 37.8 | 119.0–120.0 | 750 |
| $C_6Cl_3F_7$ | 28.2 | 145.8 | 750 |
| $C_6Cl_3F_5$ | 20.4 | 156.0–157.0 | 750 |

Example 5

A mixture of saturated halocarbon derivatives of cyclohexane was obtained and dehalogenated with zinc in acetamide solution. The dehalogenation was conducted as follows: A halocarbon mixture (1026 grams) having a composition represented approximately by the formula $C_6Br_{1.5}Cl_4F_{6.5}$ dissolved in 100 milliliters of diethyl ether and added to the following reaction mixture in a three-liter flask at reflux temperature: 1000 grams of acetamide, 647 grams of zinc dust and 50 grams of sodium iodide. Addition of halocarbon was made over a twelve-hour period and heating on a steam cone was continued overnight. The reflux condenser was then replaced by a distilling column and the temperature raised gradually to 180 degrees centigrade. When distillation ceased, steam distillation was employed. The entire distillate, weighing 404 grams, was washed with sodium bicarbonate solution, hydrochloric acid, and water. At this point intermediate fractions from Example 4 were added and the entire halocarbon mixture rectified in a 100-plate Podbielniak column. Fractions obtained were $C_6F_8$, $C_6F_6$, $C_6ClF_7$, $C_6Cl_2F_6$ and $C_6ClF_5$. Only a trace of higher boiling product was present, evidencing an excellent dehalogenation with acetamide and zinc.

Example 6

One thousand and eighteen grams of perhalomethylcyclohexanes obtained from a pentachlorobenzotrifluoride-bromine trifluoride reaction and subsequent reaction of the product with antimony pentafluoride, was dehalogenated with zinc in ethanol. The halocarbon mixture, containing 41.6 per cent fluorine and 31.7 per cent total chlorine and a small amount of bromine calculated as chlorine, was added to 600 grams of zinc in 500 milliliters of ethanol at reflux temperature. Two hundred milliliters of ethanol was added with the halocarbon over an eight-hour period to reduce the viscosity of the reaction mixture. The temperature was then raised to 140 degrees centigrade while ethanol and some product distilled. The remainder of the product was removed by steam distillation. After being washed free of ethanol, the product was dried over Drierite. The mixture of products, weighing 727 grams, was rectified in a 100-plate Podbielniak column and yielded three large plateaus which were separated and identified as perfluorotoluene, chlorotetrafluoro (trifluoromethyl) benzene and dichlorotrifluoro (trifluormethyl)-benzene. Intermediate fractions were rectified in a four-foot, glass-packed column and yielded non-aromatic unsaturated halocarbons. Complete data are included in the table below:

| Compound | Grams | Boiling Range, degrees C. | mm. Hg. |
|---|---|---|---|
| $C_6F_5.CF_3$ | 95 | 103.0–104.0 | 740 |
| $C_6ClF_4.CF_3$ | 189 | 134 –137.5 | 740 |
| $C_6Cl_2F_3.CF_3$ | 112 | 170.3–171.3 | 742 |
| $C_6Cl_2F_7.CF_3$ | small amt. | 128.5–129.5 | 751 |
| $C_6Cl_3F_6.CF_3$ | do | 158 –160 | 745 |

*Example 7*

Three hundred thirty-seven grams of zinc dust was suspended in 500 grams of water, heated to reflux temperature and a mixture of alicyclic halocarbons having the approximate composition $C_7Cl_5F_9$, produced by a reaction between pentachlorobenzotrifluoride and fluorinating agents, i. e., bromine trifluoride and antimony pentafluoride, was added thereto over a four-hour period. An additional 400 milliliters of water was also added to maintain a fluid mixture. The reaction yielded 260 grams of product which upon rectification was identified as $C_6F_5.CF_3$, $C_6Cl_4.CF_3$ and $C_6Cl_2F_3.CF_3$. Intermediate ranges were large but contained no olefinic fractions. The absence of olefinic products shows that zinc in water is an effective dehalogenating medium.

*Example 8*

Three hundred ninety-one grams of a mixture of perhalodimethylcyclohexanes, produced by the reaction of bromine trifluoride and tetrachlorobis(trifluoromethyl)-benzene and containing by analysis 44.7 per cent fluorine and 27.8 per cent total chlorine and bromine calculated as chlorine, was added over an eight-hour period to a refluxing suspension of 150 grams of zinc dust in 300 milliliters of ethanol. The temperature was then raised to 160 degrees centigrade, permitting the distillation of the more volatile products and ethanol. Remaining products of the reaction were removed by steam distillation. The entire distillate, weighing 150 grams, was rectified and from the mixture were separated perfluoroxylene, chlorotrifluoro-bis(trifluoromethyl)benzene and dichlorodifluoro-bis(trifluoromethyl)-benzene.

*Example 9*

Two hundred and twenty-two grams of perhalonaphthalanes, prepared by the reaction of fluorinating agents, i. e., bromine trifluoride and antimony pentafluoride, and octachloronaphthalene and containing 34.8 per cent fluorine and 33.7 per cent total chlorine and bromine calculated as chlorine, was added to 200 grams of zinc dust in 250 milliliters of ethanol at reflux temperature in a period of eight hours. The temperature was raised to 140 degrees centigrade while ethanol distilled from the reaction mixture. The residue was then steam-distilled to yield 100 grams of a colorless liquid. The organic product, when rectified, was found to include chloroheptafluoronaphthalene and a perhalo derivative of dihydronaphthalene having the empirical formula $C_{10}ClF_9$.

*Example 10*

Five hundred grams of a halocarbon was prepared by reacting decachlorobiphenyl with bromine trifluoride and treating the product with antimony pentafluoride. Ether was used to dissolve the halocarbon, which corresponded to a mixture of average composition $C_{12}Cl_8F_{14}$, and the resulting solution was added slowly to a stirred mixture of 309 grams of zinc dust, 300 grams of acetamide, 100 grams of anhydrous sodium carbonate and 10 grams of sodium iodide catalyst at 120 degrees centigrade. After a four-hour period, during which all the halocarbon was added, the mixture was heated at 150 degrees centigrade for two additional hours. The organic product was then extracted from the residue with 10 portions of ether and steam-distillation was used as a method of purification. A sample of the product contained 16.3 per cent chlorine and 41.7 per cent fluorine, checking dichlorooctafluorobiphenyl, $C_{12}Cl_2F_8$. Distillation at 3 millimeters of mercury pressure yielded three main fractions, boiling 95–115 degrees centigrade, 115–128 degrees centigrade, and 128–145 degrees centigrade. Analysis of the first fraction checked, with fair agreement, monochlorononafluorobiphenyl, but the product nevertheless was a mixture.

*Example 11*

In the same manner as above, 300 grams of bicyclohexyl halocarbon derivatives was dehalogenated. Owing to the viscosity of the halocarbon mixture, it was dissolved in 200 milliliters of ethanol and zinc dust was added thereto. The zinc dust was placed in an Erlenmeyer flask, connected to the reaction flask by a one-inch rubber tube, inverted, and a pinch-clamp used to control flow into the reaction. Three hundred and eighteen grams of zinc dust was added slowly during four hours with the reaction mixture maintained at 85 degrees centigrade. The reaction was then heated to 140 degrees centigrade for four hours and the product steam-distilled. Rectification of the 200 grams of organic product which resulted yielded fractions similar to those cited in Example 10.

*Example 12*

Magnesium dust (75 grams) was suspended in 500 grams of acetamide and 20 grams of sodium iodide catalyst at steam temperature. Three hundred grams of a halocarbon cyclohexane derivative was added slowly to the mixture during a three-hour period. The low-boiling liquid was then distilled and the temperature raised. At 150 degrees centigrade the liquid became excessively viscous and hydrochloric acid was added. The mixture was then steam-distilled and rectified. Dehalogenation was evident, but not as much desired low-boiling material was recovered as in previous dehalogenations with zinc.

While the present invention, in its broader sense, is applicable to increase the number of nuclear carbon-carbon multiple bonds in any alicyclic halocarbon containing at least one fluorine atom attached to a carbon atom of the ring, a preferred and very desirable embodiment of the invention resides in its application to alicyclic halocarbons containing fluorine and at least two halogen atoms other than fluorine attached to carbon atoms of the ring. In this embodiment, our new dehalogenation process is especially satisfactory, and has proven a valuable method of producing aromatic fluorocarbons and ring-fluorine-containing halocarbons, as the halogen atoms other than fluorine are apparently first removed from the ring of the alicyclic halocarbon treated. This embodiment is, moreover, still more effective in the treatment of such compounds having at least two of the halogen atoms other than fluorine attached to adjacent carbon atoms. In any embodiment of the invention, the preferred medium for the reaction is an organic solvent, such as ethanol, butanol or acetamide, which is non-reactive with the reactants under the conditions employed.

Alicyclic halocarbons which may be treated in the process may be either saturated or unsaturated, including bicyclic structures such as tetralin, decalin and bicyclohexyl derivatives, et cetera, which are unsaturated to any degree short of aromaticity, as these compounds may be treated in the process to prepare the aromatic fluorocarbon or ring-fluorine-containing halocarbons.

As many apparently widely different embodiments of the invention will, from the foregoing, be immediately obvious to one skilled in the art, it is to be understood that we do not limit ourselves to specific embodiments thereof except as defined in the appended claim.

The present application is a continuation-in-part of our prior-filed copending applications Serial 628,374, 628,375, 628,376, 628,377, 628,378, 628,379, 628,380, and 675,822, now Patents Nos. 2,509,155, 2,509,156, 2,480,080, 2,432,997, 2,459,779, 2,498,891, 2,461,554, and 2,488,216, respectively, in all of which is disclosed the dehalogenation process herein further described and claimed.

We claim:

The compound chloropentafluorobenzene, $C_6ClF_5$, boiling at about 122–123 degrees centigrade at 750 millimeters of mercury pressure absolute.

EARL T. McBEE.
WALDO B. LIGETT.
VINCENT V. LINDGREN.

REFERENCES CITED

The following references are of record in the file of this patent:

UNITED STATES PATENTS

| Number | Name | Date |
|---|---|---|
| 2,235,762 | Hass et al. | Mar. 18, 1941 |
| 2,344,061 | Renoll | Mar. 14, 1944 |
| 2,399,024 | Harmon | Apr. 23, 1946 |
| 2,401,897 | Benning et al. | June 11, 1946 |
| 2,404,374 | Harmon | July 23, 1946 |
| 2,436,142 | Harmon | Feb. 17, 1948 |

OTHER REFERENCES

Van der Linden, "Recueil travaux chim. des. Pays-Bas," vol. 55, pages 569–76 (1936).

Bigelow et al., Jour. Am. Chem. Soc., vol. 56, 2773–4 (1934).